US012576590B2

(12) United States Patent
Teramoto et al.

(10) Patent No.: US 12,576,590 B2
(45) Date of Patent: Mar. 17, 2026

(54) THREE-DIMENSIONAL SHAPING SYSTEM

(71) Applicant: SEIKO EPSON CORPORATION, Tokyo (JP)

(72) Inventors: Tatsuya Teramoto, Shiojiri (JP); Taki Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 18/509,763

(22) Filed: Nov. 15, 2023

(65) Prior Publication Data

US 2024/0165878 A1    May 23, 2024

(30) Foreign Application Priority Data

Nov. 18, 2022    (JP) ................................. 2022-184668

(51) Int. Cl.
| | |
|---|---|
| B29C 64/245 | (2017.01) |
| B29C 64/209 | (2017.01) |
| B29C 64/232 | (2017.01) |
| B29C 64/295 | (2017.01) |
| B33Y 30/00 | (2015.01) |

(52) U.S. Cl.
CPC .......... B29C 64/295 (2017.08); B29C 64/209 (2017.08); B29C 64/232 (2017.08); B29C 64/245 (2017.08); B33Y 30/00 (2014.12)

(58) Field of Classification Search
None
See application file for complete search history.

(56) References Cited

U.S. PATENT DOCUMENTS

| | | | | |
|---|---|---|---|---|
| 8,658,076 | B2 * | 2/2014 | El-Siblani | ............. G03F 7/0037 |
| | | | | 264/460 |
| 11,926,092 | B2 * | 3/2024 | von Burg | ................ B22F 12/13 |
| 2019/0381783 | A1 * | 12/2019 | Bihari | .................. B29C 64/118 |
| 2022/0355544 | A1 | 11/2022 | Abe | |
| 2023/0356472 | A1 * | 11/2023 | Feinberg | ................ A61L 27/52 |

FOREIGN PATENT DOCUMENTS

| | | |
|---|---|---|
| JP | 2017-523063 A | 8/2017 |
| JP | 2022-170965 A | 11/2022 |
| WO | WO2015/193819 A | 12/2015 |

* cited by examiner

*Primary Examiner* — Yung-Sheng M Tsui
(74) *Attorney, Agent, or Firm* — WORKMAN NYDEGGER

(57) ABSTRACT

A three-dimensional shaping system includes: a dispensing unit including a plasticizing unit configured to plasticize a material to generate a plasticizing material and a nozzle configured to dispense the plasticizing material; a stage allowing the plasticizing material to be laminated; a moving unit configured to change a relative position between the nozzle and the stage; and a plate-shaped heating unit including a first heater configured to heat the plasticizing material laminated on the stage, the plate-shaped heating unit having a through hole formed therein. At least a part of the nozzle is located in the through hole during shaping of a shaped object. The moving unit changes a position of the heating unit with respect to the stage in conjunction with a change in a position of the nozzle with respect to the stage, and a part of at least one of the stage and the heating unit is made of a transparent material.

8 Claims, 11 Drawing Sheets

THREE-DIMENSIONAL SHAPING SYSTEM

The present application is based on, and claims priority from JP Application Serial Number 2022-184668, filed Nov. 18, 2022, the disclosure of which is hereby incorporated by reference herein in its entirety.

BACKGROUND

1. Technical Field

The present disclosure relates to a three-dimensional shaping system.

2. Related Art

There is known a three-dimensional shaping device that shapes a three-dimensional shaped object by dispensing a plasticizing material toward a stage and curing the material.

For example, JP-T-2017-523063 discloses device including a platform that supports a three-dimensional object, an extrusion head on which a thermoplastic material is deposited, and an energy source coupled to the extrusion head via a support arm. In the device described in JP-T-2017-523063, after a layer deposited on the platform is heated by the energy source, a subsequent layer is deposited on the layer to increase a bonding strength between the two layers.

However, in JP-T-2017-523063, in order to laminate subsequent layers on the heated layer, it is necessary to heat a front part of a nozzle of the extrusion head with the energy source. Therefore, every time a moving direction of the nozzle is changed, the energy source needs to be moved to a position where the front part of the nozzle can be heated. As a result, control of the device is complicated.

SUMMARY

A three-dimensional shaping system according to one aspect of the present application includes: a dispensing unit including a plasticizing unit configured to plasticize a material to generate a plasticizing material and a nozzle configured to dispense the plasticizing material; a stage allowing the plasticizing material to be laminated; a moving unit configured to change a relative position between the nozzle and the stage; and a plate-shaped heating unit including a first heater configured to heat the plasticizing material laminated on the stage, the plate-shaped heating unit having a through hole formed therein. At least a part of the nozzle is located in the through hole during shaping of a shaped object. The moving unit changes a position of the heating unit with respect to the stage in conjunction with a change in a position of the nozzle with respect to the stage, and a part of at least one of the stage and the heating unit is partially made of a transparent material.

BRIEF DESCRIPTION OF THE DRAWINGS

FIG. 2 is a schematic configuration diagram of the three-dimensional shaping system.

DESCRIPTION OF EMBODIMENTS

Embodiment 1

Outline of Three-Dimensional Shaping System

Figure 1:
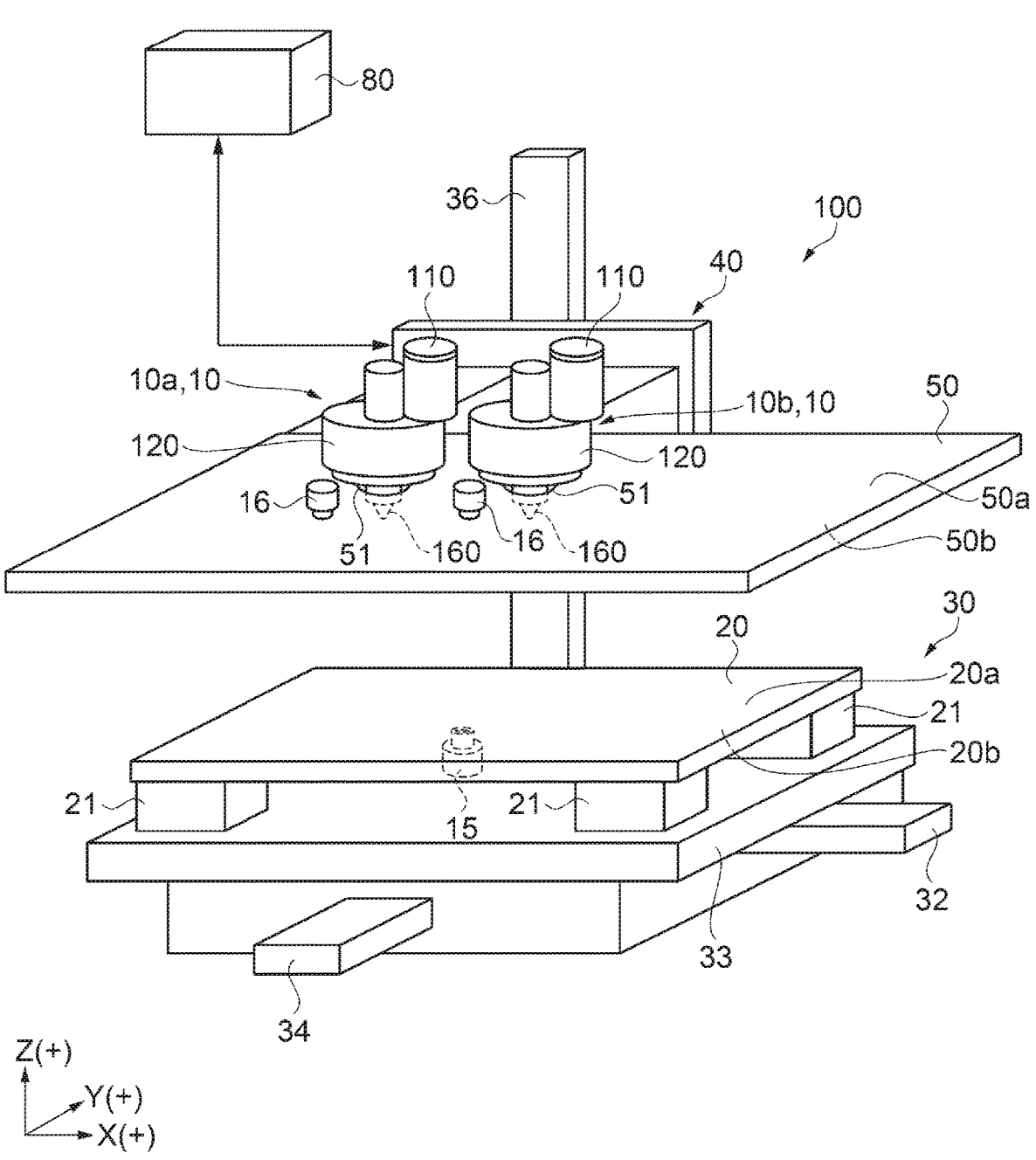
FIG. 1 is a perspective view showing an outline of a three-dimensional shaping system according to Embodiment 1.

FIG. 1 is a perspective view showing an outline of a three-dimensional shaping system. Hereinafter, embodiments of the present disclosure will be described with reference to the drawings.

A three-dimensional shaping system 100 shown in FIG. 1 drives a moving unit 30 to change a relative position between dispensing devices 10 and a stage 20 while dispensing a plasticized plasticizing material from the dispensing devices 10 toward the stage 20. Accordingly, the three-dimensional shaping system 100 shapes a three-dimensional shaped object having a desired shape on the stage 20.

In the drawings, an X axis, a Y axis, and a Z axis are shown as three axes orthogonal to one another. In the embodiment, an extending direction of a long side of the stage 20 having a rectangular shape is defined as an X plus direction, an extending direction of a short side is defined as a Y plus direction, and a height direction of the dispensing device 10 is defined as a Z plus direction. The Z plus direction is also referred to as upper, and a Z minus direction is also referred to as lower. The X plus direction and an X minus direction are also referred to as an X-axis direction. The same applies to the Y axis and the Z axis.

As shown in FIG. 1, the three-dimensional shaping system 100 includes the dispensing device 10, the stage 20, the moving unit 30, a support member 40, a heating unit 50, and a control device 80.

In a preferred example, the three-dimensional shaping system 100 includes two dispensing devices 10, that is, a dispensing device 10a and a dispensing device 10b arranged side by side in the X plus direction. The dispensing device 10a and the dispensing device 10b are dispensing devices having the same configuration. Both the dispensing device 10a and the dispensing device 10b may dispense the plasticizing material constituting the three-dimensional shaped object. Alternatively, one of the dispensing device 10a and the dispensing device 10b may dispense the plasticizing material and the other may dispense a support material supporting the three-dimensional shaped object. The number of the dispensing devices 10 is not limited to two, and may be one or three or more. Hereinafter, the dispensing device 10 will be described without adding branches to contents common to both.

The stage 20 is provided below nozzles 160 of the dispensing devices 10. In a preferred example, a transparent glass plate having a substantially rectangular shape is used as the stage 20. An upper surface 20a of the stage 20 is a deposition surface on which the plasticizing material is deposited. The stage 20 is fixed on a table 33 of the moving unit 30 by four legs 21 provided at four corners below the stage 20. Although details will be described later, the table 33 is an XY table that moves in the X-axis direction and a Y-axis direction.

A first camera 15 as a detection unit is disposed on a lower surface 20b of the stage 20. The first camera 15 is disposed substantially at a center of the stage 20 with an imaging lens facing upward.

The moving unit 30 changes a relative position between the nozzles 160 of the dispensing device 10 and the stage 20 fixed on the table 33. Specifically, the moving unit 30 changes the relative position between the nozzles 160 and the stage 20 in the X-axis direction and the Y-axis direction by moving the stage 20 in the X-axis direction and the Y-axis direction. Further, the moving unit 30 changes the relative position between the nozzles 160 and the stage 20 in a Z-axis direction by moving the dispensing devices 10 and the heating unit 50 in the Z-axis direction.

The moving unit 30 includes a first electric actuator 32, a second electric actuator 34, and a third electric actuator 36. Each actuator is, for example, a linear actuator including a motor and a ball screw mechanism.

The first electric actuator 32 moves the stage 20 in the X-axis direction. The second electric actuator 34 moves the stage 20 in the Y-axis direction. The third electric actuator 36 moves the dispensing devices 10 and the heating unit 50 in the Z-axis direction. The first camera 15 also moves together with the stage 20. In other words, the moving unit 30 relatively moves the stage 20 and the first camera 15 serving as the detection unit in a direction (an XY direction) perpendicular to a lamination direction of the shaped object.

The configuration of the moving unit 30 is not limited to the above configuration, and may be any configuration that can change the relative position between the nozzles 160 and the stage 20. For example, a configuration may be adopted in which the moving unit moves the stage 20 in the Z-axis direction and the dispensing device 10 in the X-axis direction and the Y-axis direction.

The support member 40 is a plate-shaped support member coupled to the third electric actuator 36, and moves in the Z-axis direction following driving of the actuator. The dispensing devices 10 and the heating unit 50 are fixed to the support member 40. The support member 40 includes an arm portion (not shown), supports the dispensing devices 10 and the heating unit 50, and moves the dispensing devices 10 and the heating unit 50 together in an upper-lower direction following the driving of the third electric actuator 36.

The heating unit 50 is disposed above the stage 20, and in a preferred example, a transparent glass plate having a substantially rectangular shape is used. A planar size of the heating unit 50 is slightly larger than that of the stage 20, and when the heating unit 50 approaches the stage 20, the heating unit 50 covers an entire surface of the stage 20. In other words, an area of the heating unit 50 is larger than that of the stage 20. The area of the heating unit 50 may be equal to or less than the area of the stage 20. The heating unit 50 is provided with two through holes 51 spaced apart in the X plus direction. The two through holes 51 correspond to the two dispensing devices 10a and 10b. A part of the nozzle 160 of the dispensing device 10 is located in the through hole 51.

That is, the heating unit 50 is installed at a position substantially the same as a height of the nozzle 160.

Second cameras 16 as the detection unit are disposed on an upper surface 50a of heating unit 50. The second cameras 16 are provided corresponding to the two dispensing devices 10a and 10b, respectively. The second camera 16 is disposed with an imaging lens facing downward.

In a preferred example, the control device 80 is a computer including one or a plurality of processors and a plurality of input and output interfaces. The control device 80 integrally controls the dispensing devices 10, the moving unit 30, the heating unit 50, and the like. The control device 80 is not limited to the computer, and may be any control device capable of integrally controlling units of the three-dimensional shaping system 100. For example, the control device may be implemented by combining a plurality of circuits.

Configuration of Dispensing Device

Figure 2:
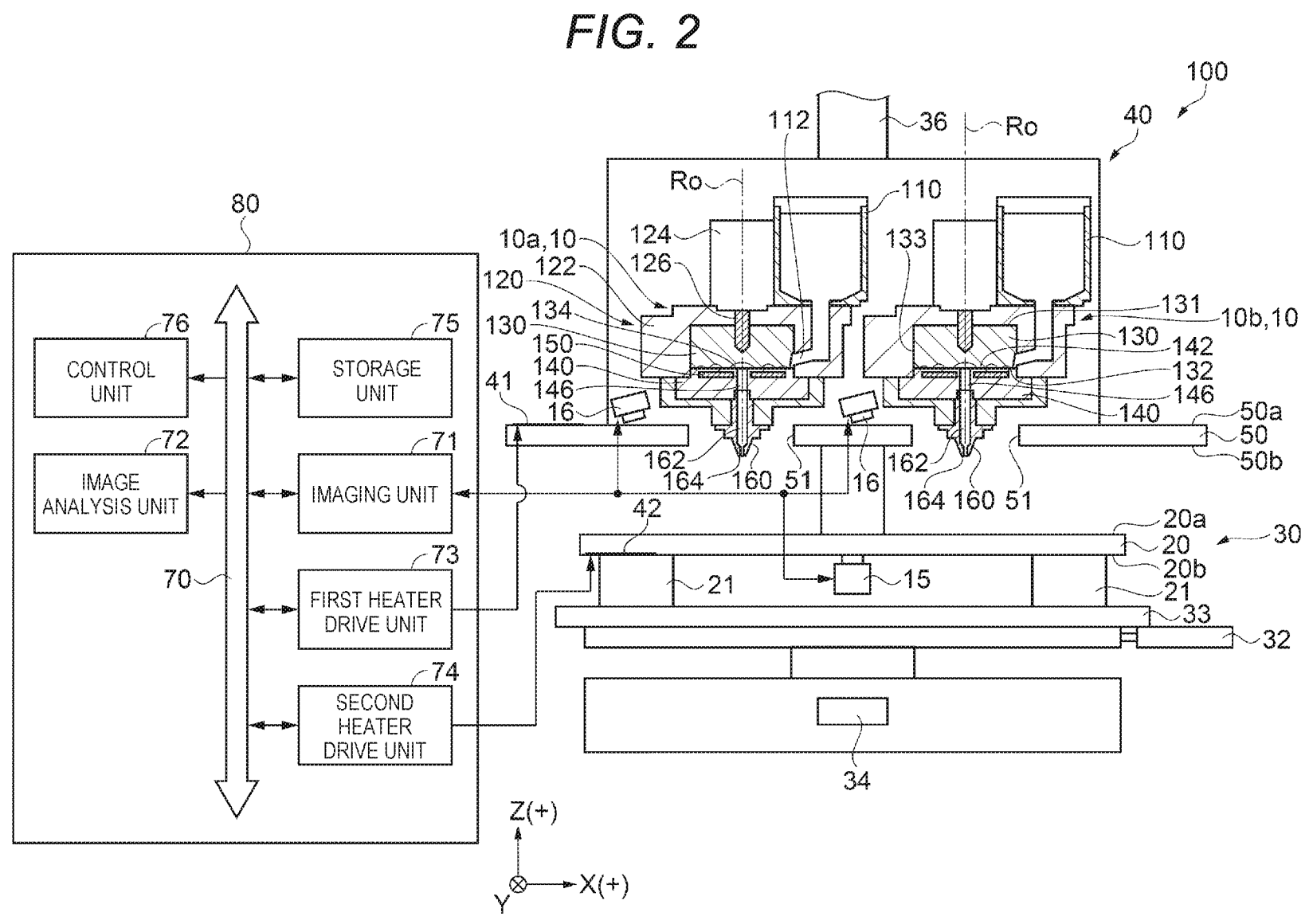
Figure 3:
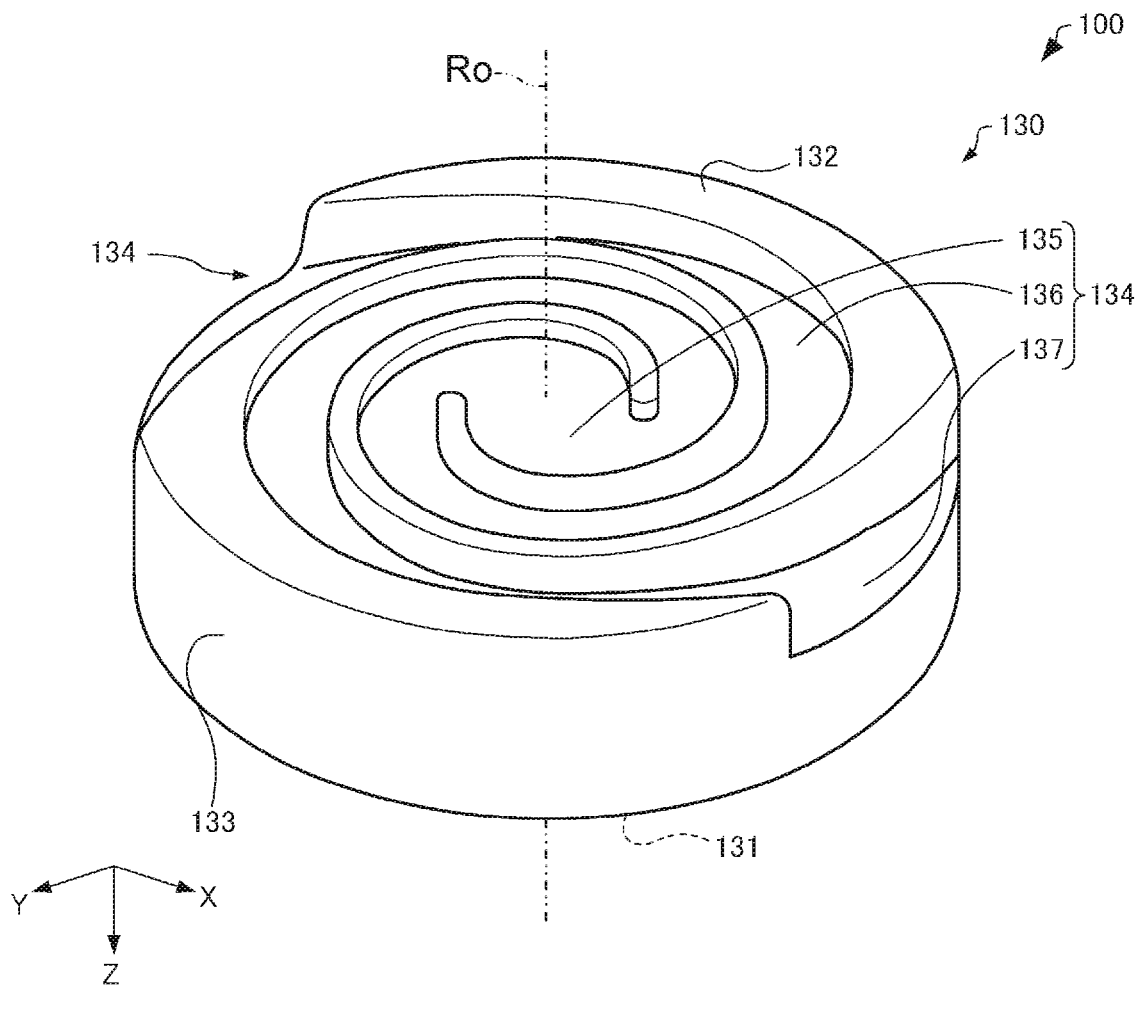
FIG. 3 is a perspective view of a flat screw.
Figure 4:
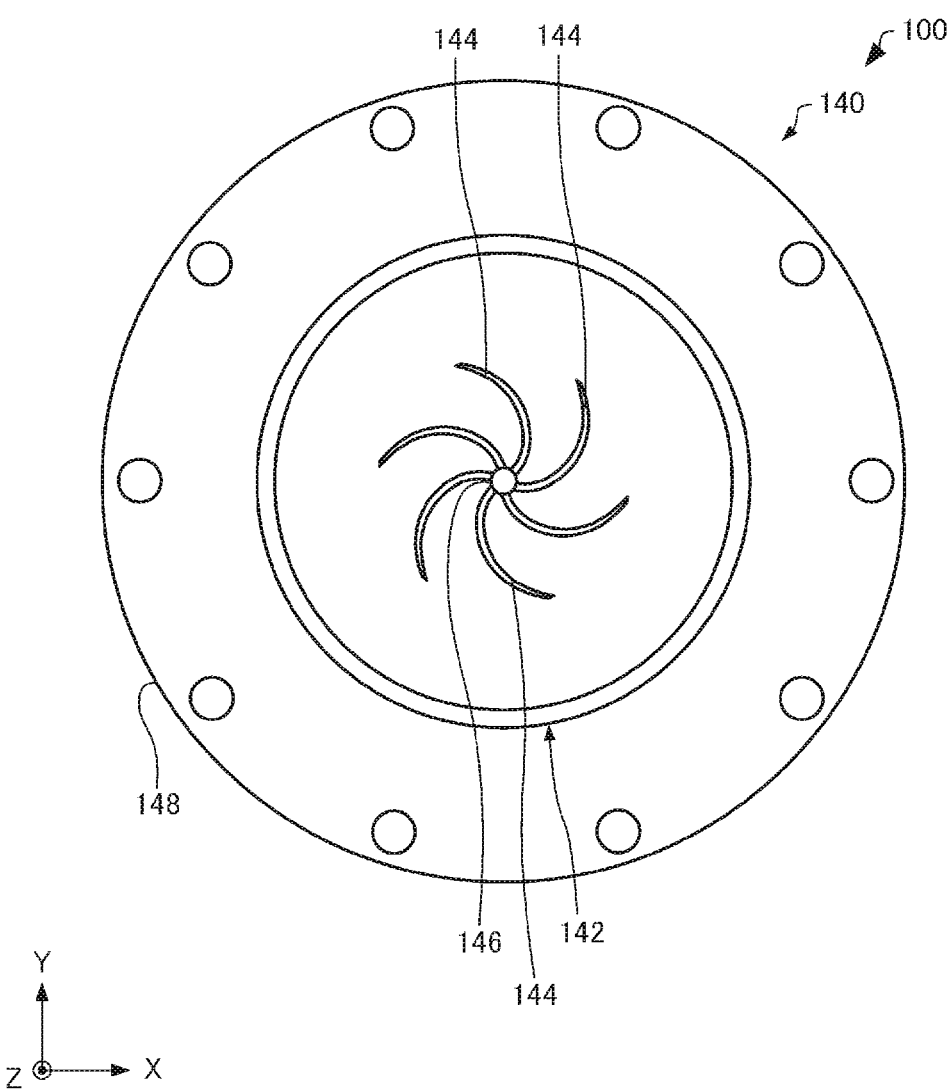
FIG. 4 is a plan view of a barrel.

FIG. 2 is a schematic configuration diagram of the three-dimensional shaping system and shows a cross-sectional view of the dispensing device. FIG. 3 is a perspective view of a flat screw. FIG. 4 is a plan view of a barrel.

As shown in FIG. 2, the dispensing device 10 includes a material supply unit 110, a plasticizing unit 120, and the nozzle 160.

The material supply unit 110 is a hopper and is a storage unit that stores a material to be supplied to the plasticizing unit 120. A pellet-shaped or powdery material is charged into the material supply unit 110. As thermoplastic material, for example, a thermoplastic resin such as an acrylonitrile butadiene styrene (ABS) resin can be used. Examples of the thermoplastic resin include general-purpose engineering plastics and super engineering plastics.

The material supply unit 110 and the plasticizing unit 120 are coupled by a supply path 112 provided below the material supply unit 110. The material charged into the material supply unit 110 is supplied to the plasticizing unit 120 through the supply path 112.

The plasticizing unit 120 includes a screw case 122, a drive motor 124, a flat screw 130, a barrel 140, and a heater 150. The plasticizing unit 120 plasticizes a material in a solid state supplied from the material supply unit 110, generates a paste-shaped plasticizing material having fluidity, and supplies the plasticizing material to the nozzle 160. The configuration is not limited to the configuration using the flat screw 130, and any configuration that can generate the plasticizing material may be used. For example, instead of the flat screw, a configuration using a long in-line screw having a spiral groove on a side surface portion may be used. In this case, the material is plasticized by rotation of the in-line screw. "Plasticizing" is a concept including melting, and refers to changing from a solid state to a state of presenting fluidity. Specifically, in a case of a material in which glass transition occurs, "plasticizing" refers to setting a temperature of the material to be equal to or higher than a glass transition point. In a case of a material in which the glass transition does not occur, "plasticizing" refers to setting a temperature of the material to be equal to or higher than a melting point thereof.

The screw case 122 is a housing in which the flat screw 130 is accommodated. The barrel 140 is provided on a lower surface of the screw case 122. The flat screw 130 is accommodated in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130 and rotates about a rotation axis Ro. The drive motor 124 is rotationally controlled by a control unit 76. The shaft 126 of the drive motor 124 and the upper surface 131 of the flat screw 130 may be coupled via a speed reducer (not shown).

As shown in FIG. 3, the flat screw 130 has a substantially columnar shape whose thickness is smaller than a size in a direction orthogonal to a direction of the rotation axis Ro. The flat screw 130 rotates about the rotation axis Ro, which follows the rotation of the shaft 126 of the drive motor 124. FIG. 3 shows a state in which an upper-lower positional relationship is reversed from a state shown in FIG. 2.

The flat screw 130 has the upper surface 131, a groove forming surface 132 opposite to the upper surface 131, and a side surface 133 coupling the upper surface 131 and the groove forming surface 132. First grooves 134 are formed in the groove forming surface 132. The side surface 133 is, for example, substantially perpendicular to the groove forming surface 132.

The first grooves 134 are formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. The coupling portion 136 is provided in a spiral shape from the central portion 135 toward an outer periphery of the groove forming surface 132.

The material introduction portion 137 is provided at the outer periphery of the groove forming surface 132. That is, the material introduction portion 137 is provided in the side surface 133 of the flat screw 130. The material supplied from the material supply unit 110 is introduced from the material introduction portion 137 into the first groove 134, passes through the coupling portion 136 and the central portion 135, and is conveyed to the communication hole 146 formed in the barrel 140. For example, two first grooves 134 are provided. The number of the first grooves 134 is not limited to two, and may be one or three or more as long as the material can be supplied.

As shown in FIG. 2, the barrel 140 is provided below the flat screw 130. The barrel 140 has a facing surface 142 facing the groove forming surface 132 of the flat screw 130. The communication hole 146 communicating with the first groove 134 is formed at a center of the facing surface 142.

As shown in FIG. 4, second grooves 144 and the communication hole 146 are formed in the facing surface 142 of the barrel 140. A plurality of the second grooves 144 are formed. In FIG. 4, six second grooves 144 are formed, and the number of the second grooves 144 is not particularly limited. The plurality of second grooves 144 are formed around the communication hole 146 in a plan view from the Z plus direction. One end of each of the plurality of second grooves 144 is coupled to the communication hole 146, and the second grooves 144 extend spirally from the communication hole 146 toward an outer periphery 148 of the barrel 140. The second grooves 144 have a function of guiding the plasticized plasticizing material to the communication hole 146.

The description returns to FIG. 2.

As shown in FIG. 2, the heater 150 is provided inside the barrel 140. The heater 150 heats the material supplied between the flat screw 130 and the barrel 140. In a preferred example, the heater 150 is provided in a ring shape surrounding the communication hole 146 in a plan view. A plurality of concentric circular ring heaters may be provided. Output of the heater 150 is controlled by the control unit 76.

The plasticizing unit 120 generates the plasticized plasticizing material by heating the material while conveying the material toward the communication hole 146 by using the flat screw 130, the barrel 140, and the heater 150. Then, the plasticizing unit 120 dispense the generated plasticizing material from the communication hole 146.

The nozzle 160 is provided below the barrel 140. A nozzle flow path 162 is formed in the nozzle 160. The nozzle flow path 162 communicates with the communication hole 146. The plasticizing material is supplied to the nozzle flow path 162 from the communication hole 146. A tip end of the nozzle flow path 162 is a nozzle opening 164. The nozzle 160 dispenses the plasticizing material from the nozzle opening 164 toward the stage 20.

In other words, the three-dimensional shaping system 100 includes the dispensing device 10 serving as a dispensing unit including the plasticizing unit 120 that plasticizes a material to generate a plasticizing material and the nozzle 160 that dispenses the plasticizing material, the stage 20 on which the plasticizing material is laminated, and the moving unit 30 that changes a relative position between the nozzle 160 and the stage 20.

Configuration of Detection Unit and Heating Unit

Here, detailed configurations of the first camera 15 and the second camera 16 serving as the detection units, and the heating unit 50 will be described with reference to FIG. 2.

As shown in FIG. 2, the second cameras 16 are disposed on the upper surface 50a of the heating unit 50 with the imaging lens facing downward. Specifically, the second camera 16 is disposed such that the imaging lens faces the nozzle opening 164, and is set at a position where a shaped object on the stage 20 can be imaged through the heating unit 50.

The second camera 16 is a small camera including an imaging element such as a charge coupled device (CCD) sensor or a complementary metal oxide (CMOS) sensor. The second camera 16 is electrically coupled to an imaging unit 71 of the control device 80 via a wiring cable. The coupling is not limited to the coupling using the wiring cable, and wireless communication may be used as long as image data obtained by imaging by the second camera 16 can be transmitted to the control device 80. For example, wireless communication using a wireless local area network (LAN) may be used. In this case, a wireless communication module conforming to a wireless LAN standard is added to each of the second camera 16 and the control device 80.

As shown in FIG. 2, the first camera 15 is disposed on the lower surface 20b of the stage 20 with the imaging lens facing upward, and is set at a position where a shaped object on the stage 20 can be imaged through the stage 20. The first camera 15 is a small camera similar to the second camera 16, and is electrically coupled to the imaging unit 71 of the control device 80 in a wired or wireless manner. The detection unit is not limited to the camera, and may be any detection unit capable of detecting the shaped object on the stage, for example, an infrared sensor or a laser displacement meter.

In other words, the three-dimensional shaping system 100 includes the first camera 15 and the second cameras 16 as the detection units that detect the shaped object on the stage 20, and the detection unit is disposed at least one of below the stage 20 and above the heating unit 50.

As shown in FIG. 2, the control device 80 includes the imaging unit 71, an image analysis unit 72, a first heater drive unit 73, a second heater drive unit 74, a storage unit 75, and the control unit 76. In FIG. 2, functional parts of the control device 80 related to the heating unit 50, the stage 20, the first camera 15, and the second cameras 16 are extracted.

The imaging unit 71 is an interface unit with the first camera 15 and the second cameras 16, and is a control unit that controls the cameras. The imaging unit 71 receives image data from the cameras, and transmits, according to an observation program, necessary image data to the image analysis unit 72, the storage unit 75, and the like via a bus line 70.

The image analysis unit 72 is an image processing unit, and in a preferred example, an image processing processor is used. The image analysis unit 72 analyzes the image data obtained by imaging by the cameras and observes a state of the shaped object. The storage unit 75 includes a random access memory (RAM), a read only memory (ROM), and a video random access memory (VRAM). The RAM is used for temporarily storing various types of data and the like, and the ROM stores a control program for controlling an operation of the three-dimensional shaping system 100, accompanying data, and the like. The VRAM is used for an image process executed by the image analysis unit 72. The control program stores, for example, an observation program that instructs an order and contents of processes for in-process monitoring a state of the shaped object on the stage 20 in a manufacturing process using the detection unit. The accompanying data includes parameters related to the image process executed by the image analysis unit 72.

The first heater drive unit 73 is a heating control circuit that performs heating control of a first heater 41 provided in the heating unit 50. The first heater drive unit 73 and the first heater 41 of the heating unit 50 are electrically coupled to each other via a wiring cable (not shown).

The control unit 76 includes one or a plurality of processors, and collectively controls an operation of the three-dimensional shaping system 100 by operating according to the control program stored in the storage unit 75. The control unit 76 is implemented by a central processing unit (CPU) including, for example, an interface circuit with a peripheral device, a calculation device, and a register.

Figure 5:
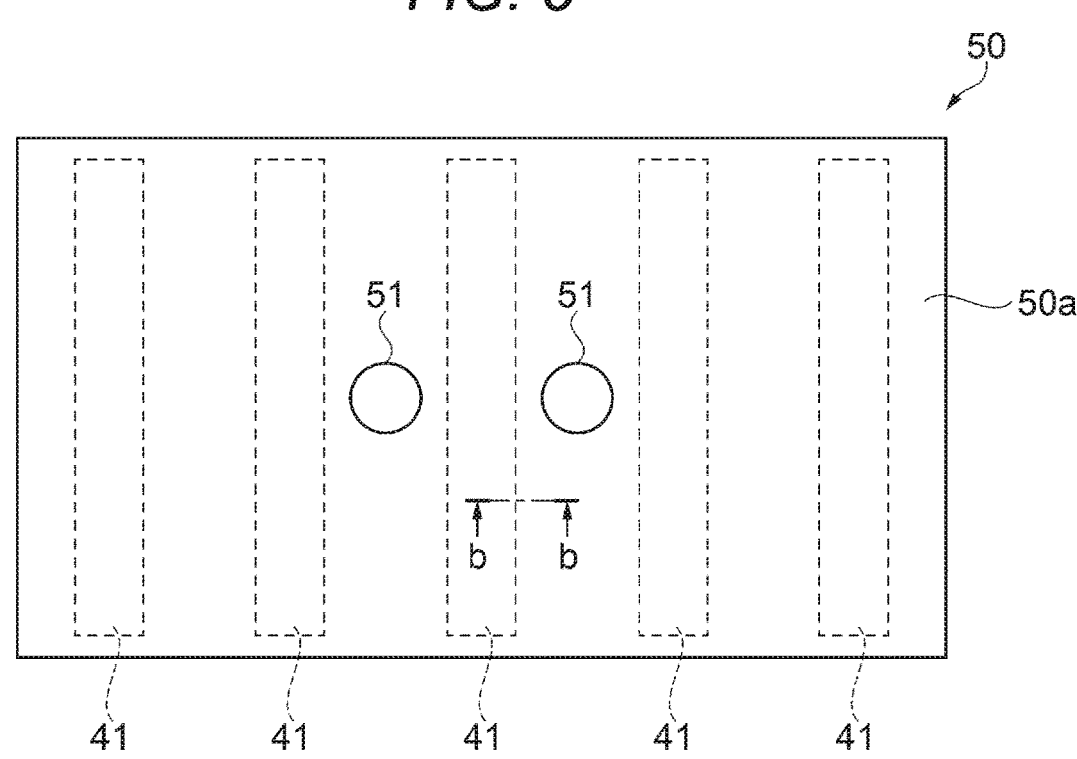
FIG. 5 is a plan view of a heating unit.
Figure 5:
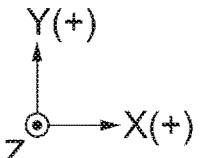
Figure 6:
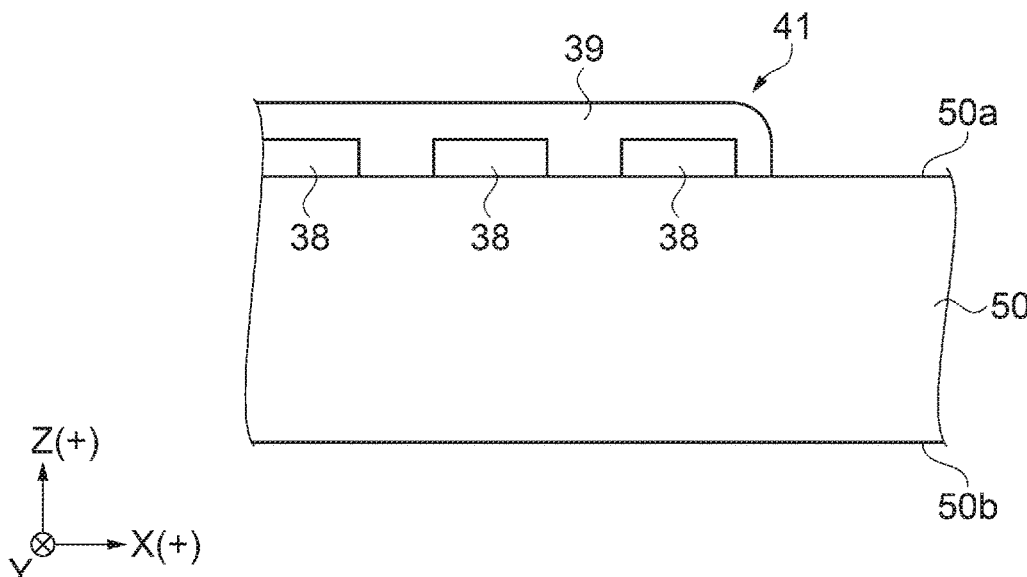
FIG. 6 is a cross-sectional view taken along a line b-b in FIG. 5.

FIG. 5 is a plan view of the heating unit. FIG. 6 is a cross-sectional view taken along a line b-b in FIG. 5.

As described above, the heating unit 50 is formed of a transparent glass plate having a substantially rectangular shape. The term "transparent" refers transparency that allows the detection unit to detect the shaped object through a glass substrate, and transmittance of visible light, infrared rays, or the like is preferably 30% or more and 100% or less, and more preferably 50% or more and 100% or less. As a glass material, heat-resistant glass is preferable, and it is preferable to use a glass material having a thermal expansion coefficient of $-3 \times 10^{-7}/°$ C. or more and $90 \times 10^{-7}/°$ C. or less.

As a preferred example, both the stage 20 and the heating unit 50 are described as using a transparent glass substrate, and the present disclosure is not limited thereto. Any one of the stage 20 and the heating unit 50 may be made of a transparent material, or a part corresponding to the detection unit may be transparent. In other words, a part of at least one of the stage 20 and the heating unit 50 is made of a transparent material.

The heating unit 50 is provided with a plurality of first heaters 41. In the example of FIG. 5, five strip-shaped first heaters 41 extending in the Y plus direction are provided in a stripe shape in the heating unit 50. In particular, the through hole 51 is sandwiched by the two first heaters 41. Accordingly, the shaped object to be shaped on the stage 20 below the through hole 51 can be efficiently heated. An arrangement mode of the first heater 41 is not limited thereto, and may be any arrangement mode in which the shaped object on the stage 20 can be efficiently heated. For example, when the heating unit 50 is divided into a first region including a center and a second region closer to peripheral edges of the heating unit 50 than the first region when viewed from the Z plus direction, the plurality of first heaters 41 may be disposed more densely in the second region than in the first region. Accordingly, it is possible to prevent a temperature decrease at the peripheral edges of the heating unit 50 and to make the temperature of the heating unit 50 uniform.

As shown in FIG. 6, the first heater 41 includes heater wirings 38 formed on the upper surface 50a of the heating unit 50 and an insulating layer 39 covering the heater wirings 38.

The heater wiring 38 is made of a transparent conductive material, and generates heat due to resistance heat generation of the conductive material. As the conductive material, for example, a metal thin film f or indium tin oxide (ITO) can be used. The heater wiring 38 is formed by, for example, a vapor deposition method. The definition of the transparency of the conductive material is the same as the definition of the glass substrate.

The heater wiring 38 is formed by a single stroke, for example, by repeating reciprocation of extending in the Y plus direction, then folding back, and extending in a Y minus direction. A metal electrode (not shown) is provided at an end portion of the heater wiring 38, and a drive power is applied from the electrode. In other words, the first heater 41 is implemented by a glass heater made of a transparent conductive material provided on the upper surface 50a of the heating unit 50 formed of a glass substrate.

The insulating layer 39 is an insulating resin layer, and for example, a polyimide resin is used. Any insulating resin may be used, and a resist or a fluororesin may be used.

Heat generated by the heater wirings 38 of the first heaters 41 is radiated from the lower surface 50b of the heating unit 50 via the heating unit 50. The shaped object on the stage 20 is heated by the heat radiated from the first heaters 41. In other words, the three-dimensional shaping system 100 includes the plate-shaped heating unit 50 including the first heaters 41 that heat the plasticizing material laminated on the stage 20 and having the through holes 51 formed therein.
Characteristics of Glass Heater For example, in the case of a heating unit in the related art made of metal such as aluminum and provided with a rubber heater, sufficient heating cannot be performed unless a distance between the heating unit and the stage 20 is reduced to about several mm. Accordingly, it is necessary to perform precise position control of the heating unit such as periodic position calibration. On the other hand, according to the heating unit 50 using the glass heater, infrared emissivity is excellent, and thus the distance between the heating unit 50 and the stage 20 can be increased as compared with the metal heating unit in the related art, and thus the periodic position calibration is unnecessary and the position control of the heating unit 50 is facilitated. Specifically, in the metal heating unit in the related art, it is necessary to control a distance between the nozzle opening 164 and the stage 20 to be about 1 mm. By using the glass heating unit 50 with high infrared emissivity, the distance between the nozzle opening 164 and the stage 20 can be set to about 10 mm. When a protrusion height from the lower surface 50b of the heating unit 50 to the nozzle opening 164 is 1 mm, the distance between the heating unit 50 and the stage 20 is preferably 2 mm or more and 11 mm or less, and more preferably 2 mm or more and 6 mm or less.

Glass has characteristics of smaller thermal expansion, higher infrared emissivity, and lower thermal conductivity than metals. For example, when a temperature setting of 80° C. to 200° C. is required in the metal heating unit in the related art, since the infrared emissivity is high in the glass heating unit 50, it is possible to obtain the same radiant heat amount at a temperature setting of 50° C. to 170° C. That is, the glass heating unit 50 has higher heating efficiency and is excellent in energy efficiency than the metal heating unit in the related art. Further, since the glass heating unit 50 has small thermal expansion, it is possible to reduce thermal strain due to its own thermal expansion.

Monitoring Mode of Shaping Process

Figure 7:
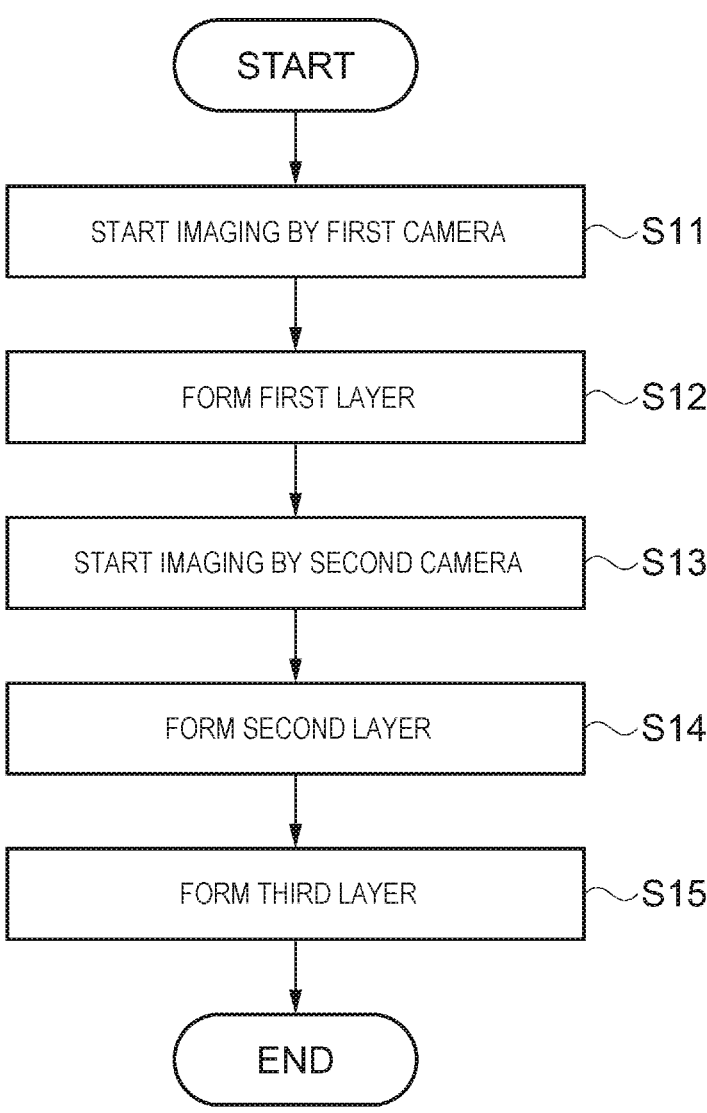
FIG. 7 is a flowchart showing a flow of monitoring of a shaping step.
Figure 8:
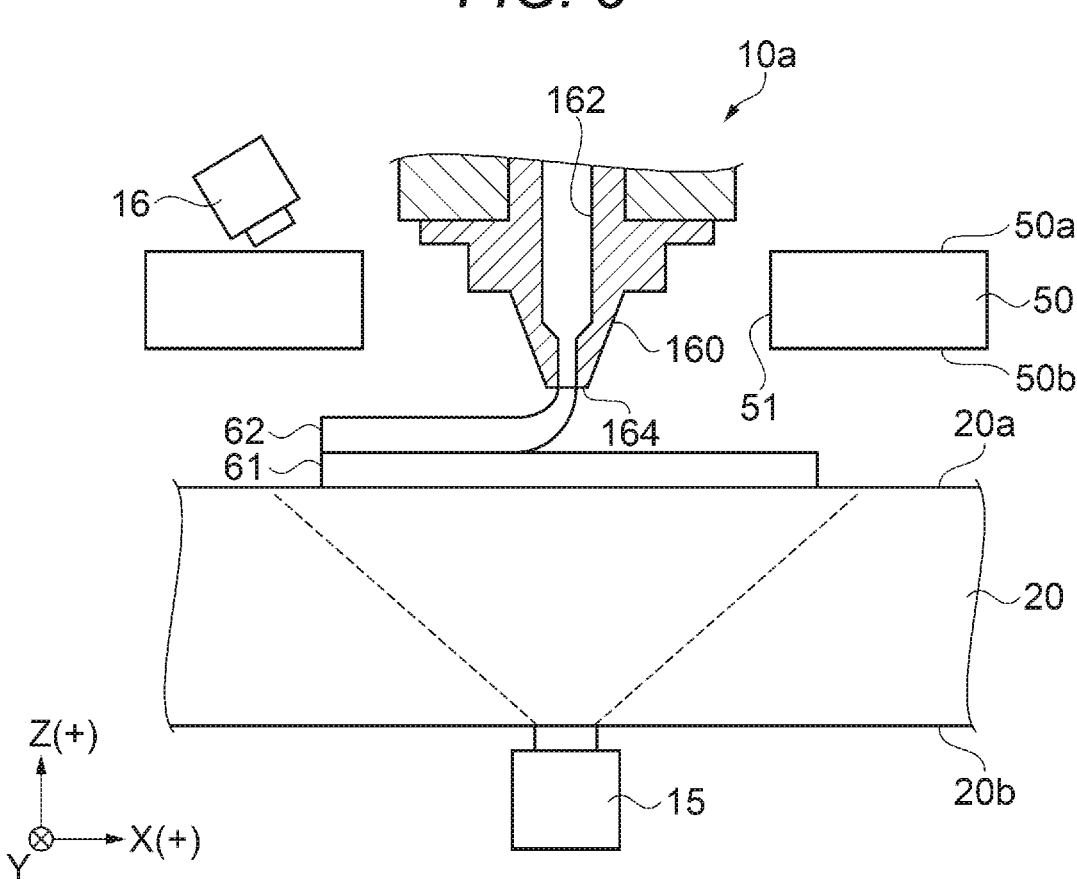
FIG. 8 is a cross-sectional view showing one process of the shaping step.

FIG. 7 is a flowchart showing a flow of monitoring of a shaping step. FIG. 8 is a cross-sectional view showing one process of the shaping step.

According to the three-dimensional shaping system 100, it is possible to perform in-process monitoring on a state of the shaped object on the stage 20 in a manufacturing process using the first camera 15 and the second camera 16 as the detection units. The following steps are performed by the control unit 76 of the control device 80 executing the observation program of the storage unit 75. In addition, the following shaping step is executed by one dispensing device 10a which is described as the dispensing device 10.

In step S11, the control unit 76 starts imaging by the first camera 15. An imaging timing may be set according to a shaping speed, and may be interval imaging in which imaging is performed at regular intervals, or may be moving image imaging.

In step S12, the control unit 76 causes the dispensing device 10 to dispense the plasticizing material and causes the moving unit 30 to change the relative position between the nozzle 160 and the stage 20 to form a first layer 61 of the shaped object. At this time, the imaging by the first camera 15 continues.

In step S13, the control unit 76 starts imaging by the second camera 16. An imaging timing may be set according to a shaping speed, and may be interval imaging in which imaging is performed at regular intervals, or may be moving image imaging. When the formation of the first layer 61 is completed, the imaging by the first camera 15 may be stopped.

In step S14, the control unit 76 causes the dispensing device 10 to dispense the plasticizing material and causes the moving unit 30 to change the relative position between the nozzle 160 and the stage 20 to form a second layer 62 of the shaped object, as shown in FIG. 8. At this time, the imaging by the second camera 16 continues.

As shown in FIG. 8, at least a part of the nozzle 160 is located in the through hole 51 during shaping of the shaped object. Then, the moving unit 30 changes the relative position between the nozzle 160 and the heating unit 50, regarded as integrated, with respect to the stage 20. In other words, the moving unit 30 changes the position of the heating unit 50 with respect to the stage 20 in conjunction with a change in a position of the nozzle 160 with respect to the stage 20.

In step S15, the control unit 76 causes the dispensing device 10 to dispense the plasticizing material and causes the moving unit 30 to change the relative position between the nozzle 160 and the stage 20 to form a third layer (not shown) of the shaped object. At this time, the imaging by the second camera 16 continues. When there is a step of forming a fourth layer or more, the imaging by the second camera 16 continues.

As described above, in the observation program, while the first layer 61 is being formed, the image data which is a detection value obtained by the first camera 15 disposed on the lower surface 20b of the stage 20 is acquired, and while the subsequent layers including the second layer 62 laminated on the first layer 61 are being formed, the image data which is a detection value obtained by the second camera 16 disposed on the upper surface 50a of the heating unit 50 is acquired. Accordingly, it is possible to observe a shaping state of all layers during the shaping step.

In other words, the three-dimensional shaping system 100 includes the control unit 76 that controls at least the first camera 15 and the second camera 16 serving as the detection units. The first camera 15 is disposed below the stage 20, and the second camera 16 is disposed above the heating unit 50. The control unit 76 acquires the image data as the detection value of the first camera 15 below the stage 20 while the first layer 61 in contact with the stage 20 is being formed, and acquires the image data as the detection value of the second camera 16 above the heating unit 50 while other layers are being formed.

Figure 9:
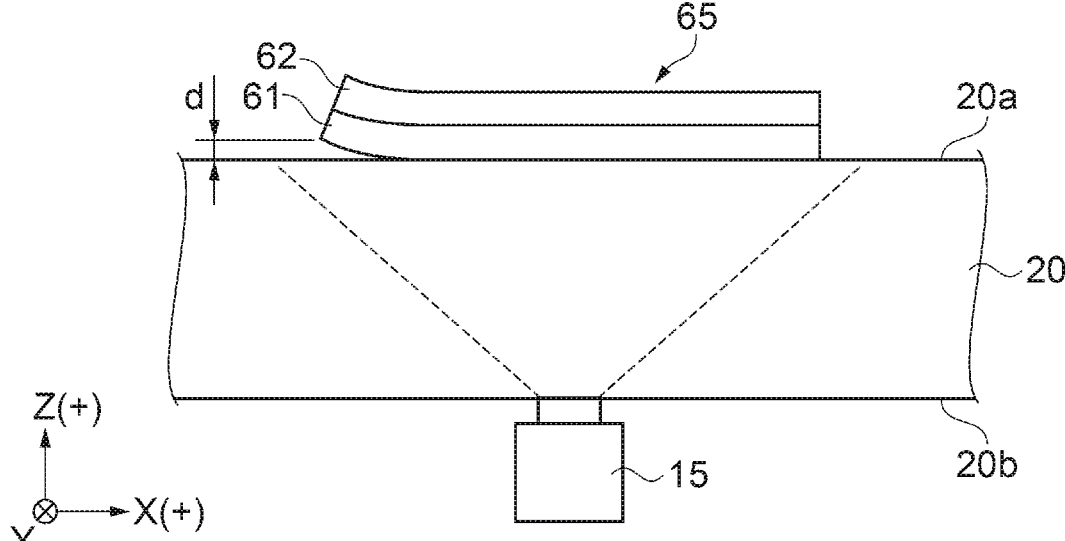
FIG. 9 is a cross-sectional view showing an aspect of a failure mode during the shaping step.

FIG. 9 is a cross-sectional view showing an aspect of a failure mode during the shaping step, and corresponds to FIG. 8.

As described above, the first camera 15 images the shaped object on the upper surface 20a from the lower surface 20b of the stage 20. In the shaping process, the shaped object may be peeled off from the upper surface 20a. The peeling can be detected by analyzing the image data of the first camera 15.

A shaped object 65 shown in FIG. 9 is a shaped object having a two-layer configuration in which the second layer 62 is laminated on the first layer 61. Here, one end of the shaped object 65 is peeled off from the upper surface 20a of the stage 20. Specifically, the one end of the shaped object 65 is peeled off from the upper surface 20a of the stage 20 and floats. A distance between the one end of the shaped object 65 and the upper surface 20a of the stage 20 is a dimension d.

Such peeling can be detected by analyzing the image data of the first camera 15. Specifically, by using the image data recorded in time series, for example, the image data without peeling immediately after the formation of the first layer 61 and the image data with peeling are compared by image processing, and occurrence of peeling can be detected by a contrast difference in a peeled portion. It is also possible to measure the dimension d, which is the distance between the one end of the shaped object 65 and the upper surface 20a of the stage 20, by analyzing changes in a plurality of pieces of image data in time series.

In other words, the first camera 15 as the detection unit disposed below the stage 20 measures distance between the first layer 61 in contact with the stage 20 and the stage 20.

Installation Configuration of Camera

Figure 10:
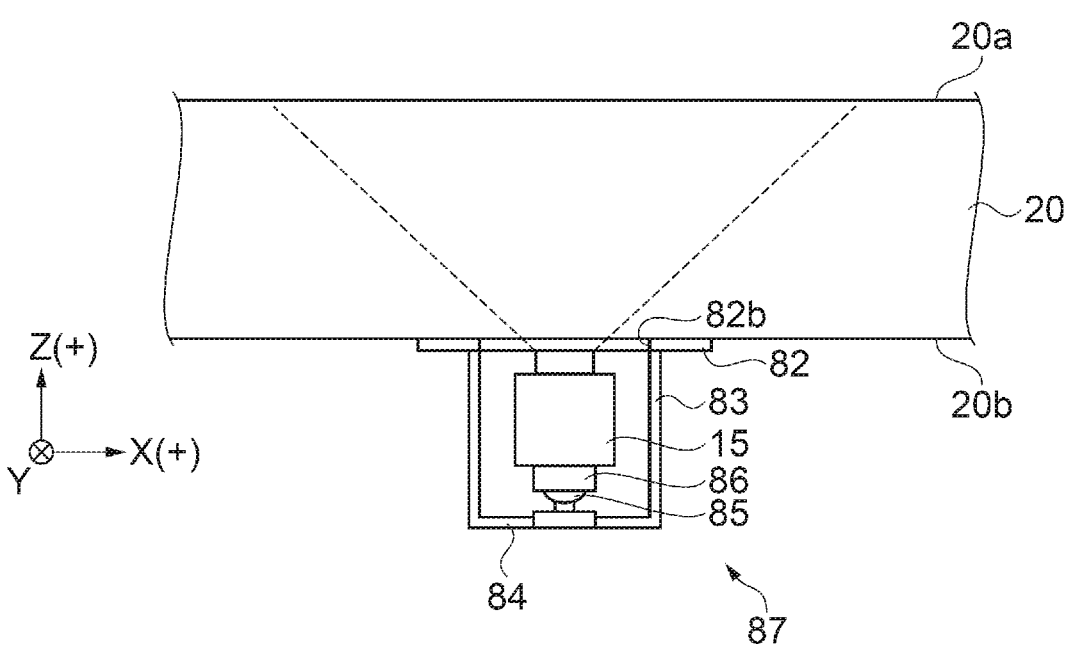
FIG. 10 is a cross-sectional view showing an example of an installation mode of a first camera.
Figure 11:
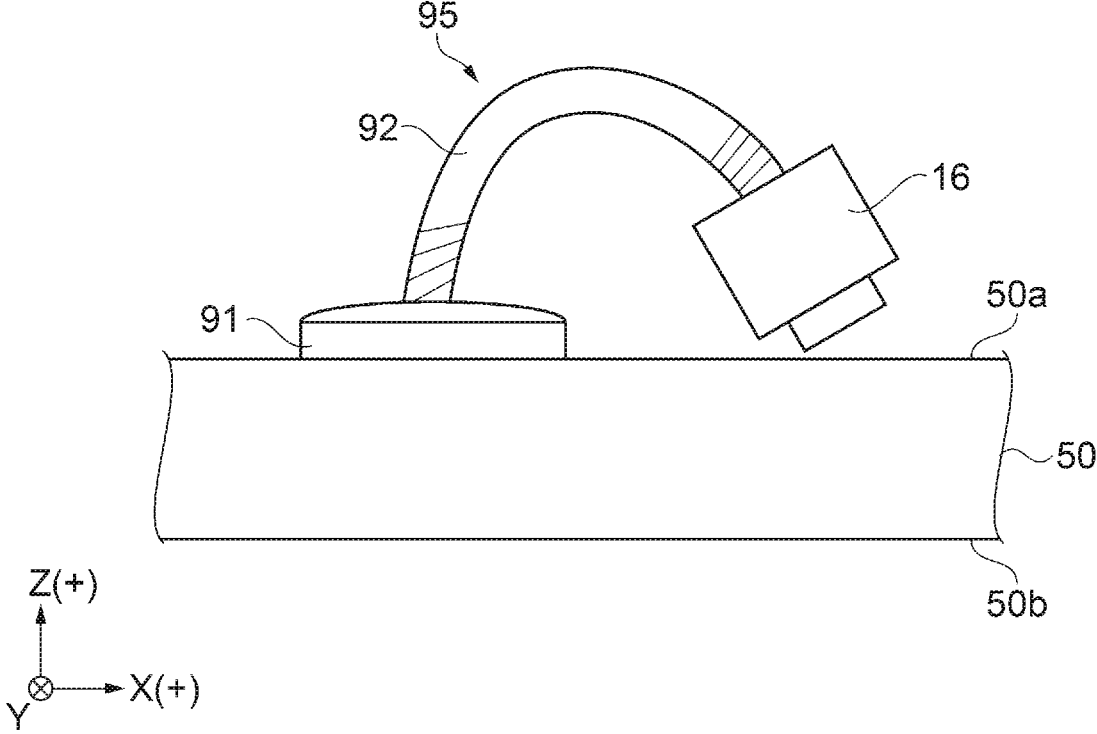
FIG. 11 is a cross-sectional view showing an example of an installation mode of a second camera.

FIG. 10 is a cross-sectional view showing an example of an installation mode of the first camera. FIG. 11 is a cross-sectional view showing an example of an installation mode of the second camera.

FIG. 10 shows an example of the installation mode of the first camera 15. The first camera 15 is fixed to the lower surface 20b of the stage 20 in a state in which the first camera 15 is set in a mounting metal fitting 87 serving as a position adjustment unit.

The mounting metal fitting 87 is a mounting frame including a ring-shaped fixing portion 82, a support portion 84, and a support column portion 83. The support column portion 83 is a support column coupling the fixing portion 82 and the support portion 84.

The first camera 15 is set in the mounting metal fitting 87 with a rear portion thereof fixed to the support portion 84 of the mounting metal fitting 87. Further, the fixing portion 82 is fixed to the lower surface 20b of the stage 20 by an adhesive or a double-sided tape. At this time, the imaging lens is located in a central hole 82b in the circular ring-shaped fixing portion 82.

A ball joint 85 is provided on the support portion 84 of the mounting metal fitting 87, and the first camera 15 includes a joint portion 86 that engages with the ball joint 85 in a pivotable manner. Accordingly, the first camera 15 is fixed to the lower surface 20b of the stage 20 in a state in which an orientation of the imaging lens is adjustable. For example, in FIG. 10, since the first camera 15 is disposed with the imaging lens facing upward, the first camera 15 can image the shaped object on the stage 20 through the stage 20. In other words, the three-dimensional shaping system 100 includes the mounting metal fitting 87 as the position adjustment unit that adjusts the position of the first camera 15 as the detection unit.

FIG. 11 shows an example of an installation mode of the second camera 16. The second camera 16 is fixed to the upper surface 50a of the heating unit 50 in a state in which the second camera 16 is set to a mounting arm 95 serving as the position adjustment unit. The mounting arm 95 includes a sucker-shaped fixing portion 91 and an arm portion 92 formed of a flexible tube. The fixing portion 91 is fixed to the upper surface 50a of the heating unit 50 by an adhesive or a double-sided tape.

The arm portion 92 is a bellows made of a metal tubular body with pleats provided therein to give elasticity, and one end of the arm portion 92 is fixed to the fixing portion 91. The other end of the arm portion 92 is coupled to a rear portion of the second camera 16. Accordingly, the second camera 16 is fixed to the upper surface 50a of the heating unit 50 in a state in which the orientation of the imaging lens is adjustable. For example, in FIG. 11, the second camera 16 is disposed such that the imaging lens faces the nozzle opening 164 (see FIG. 8), and is set at a position where the shaped object on the stage 20 can be imaged through the heating unit 50. In other words, the three-dimensional shaping system 100 includes the mounting arm 95 as the position adjustment unit that adjusts the position of the second camera 16 as the detection unit.

A mounting mechanism is not limited to the mounting metal fitting 87 and the arm portion 92, and may be any mounting mechanism capable of mounting the camera in a direction capable of imaging. For example, the camera may be disposed using a small robot arm. When the robot arm is used, an imaging direction of the camera can be changed during the shaping step.

As described above, according to the three-dimensional shaping system 100 according to the embodiment, the following effects can be obtained.

The three-dimensional shaping system 100 includes the dispensing device 10 serving as a dispensing unit including the plasticizing unit 120 that plasticizes a material to generate a plasticizing material and the nozzle 160 that dispenses the plasticizing material, the stage 20 on which the plasticizing material is laminated, the moving unit 30 that changes a relative position between the nozzle 160 and the stage 20, and the plate-shaped heating unit 50 including the first heaters 41 that heat the plasticizing material laminated on the stage 20 and in which the through holes 51 are formed. At least a part of the nozzle 160 is located within the through hole 51 during shaping of the shaped object. The moving unit 30 changes a relative position of the heating unit 50 with respect to the stage 20 in conjunction with a change in a relative position of the nozzle 160 with respect to the stage 20. At least a part of at least one of the stage 20 and the heating unit 50 is made of a transparent material.

Accordingly, since the plate-shaped heating unit 50 surrounding the nozzle 160 moves together with the nozzle 160, unlike a device in the related art in which it is necessary to move an energy source every time the moving direction of the nozzle is changed, it is not necessary to move the heating unit 50 separately from the nozzle 160, and control can be easily performed. Further, the shaped object can be checked through the stage 20 and the heating unit 50 which are formed of the transparent material.

Therefore, it is possible to provide the three-dimensional shaping system 100 that is easy to control and capable of monitoring the shaped object.

In addition, the first camera 15 and the second camera 16 are provided as the detection units that detect the shaped object on the stage 20 via the transparent material, and the detection unit is disposed at least one of below the stage 20 and above the heating unit 50.

Accordingly, the shaped object on the stage 20 can be imaged through the stage 20 by the first camera 15 installed on the lower surface 20b of the stage 20. In addition, the shaped object on the stage 20 can be imaged through the heating unit 50 by the second camera 16 installed on the upper surface 50a of the heating unit 50.

In addition, the control unit 76 that controls at least the first camera 15 and the second camera 16 as the detection units is provided. The first camera 15 and the second camera 16 are disposed below the stage 20 and above the heating unit 50. The control unit 76 acquires the image data as a detection value of the first camera 15 below the stage 20 while the first layer 61 in contact with the stage 20 is being formed, and acquires the image data as a detection value of the second camera 16 above the heating unit 50 while the second layer 62 above the first layer 61 is being formed.

Accordingly, while the first layer 61 is being formed, the image data which is a detection value obtained by the first camera 15 disposed on the lower surface 20b of the stage 20 is acquired, and while the second layer 62 above the first layer 61 is being formed, the image data which is a detection value obtained by the second camera 16 disposed on the upper surface 50a of the heating unit 50 is acquired. In a preferred example, the second camera 16 also acquires image data of third and subsequent layers. Therefore, it is possible to observe a shaping state of all layers during the shaping step. Therefore, it is possible to accurately and reliably perform in-process monitoring of the state of the shaped object during the manufacturing process.

In addition, the first camera 15 as the detection unit disposed below the stage 20 measures the distance between the first layer 61 in contact with the stage 20 and the stage 20.

Accordingly, peeling of the first layer 61 can be detected by analyzing the image data of the first camera 15. Specifically, by using the image data recorded in time series, for example, the image data without peeling immediately after the formation of the first layer 61 and the image data with peeling are compared by image processing, and occurrence of peeling can be detected by a contrast difference in a peeled portion. It is also possible to measure the dimension d, which is the distance between the one end of the shaped object 65 and the upper surface 20a of the stage 20, by analyzing changes in a plurality of pieces of image data in time series.

In addition, the moving unit 30 relatively moves the stage 20 and the first camera 15 serving as the detection unit in a direction perpendicular to the lamination direction of the shaped object.

Accordingly, since the moving unit 30 changes the relative position between the nozzles 160 of the dispensing device 10 and the stage 20 fixed on the table 33, a desired shaped object can be formed.

In addition, the mounting metal fitting 87 and the mounting arm 95 are provided as the position adjustment units that adjust positions of the first camera 15 and the second camera 16 as the detection units.

Accordingly, since the installation positions and the imaging directions of the first camera 15 and the second camera 16 can be easily adjusted, it is possible to reliably image the shaped object.

Embodiment 2

Second Heater on Stage

Figure 12:
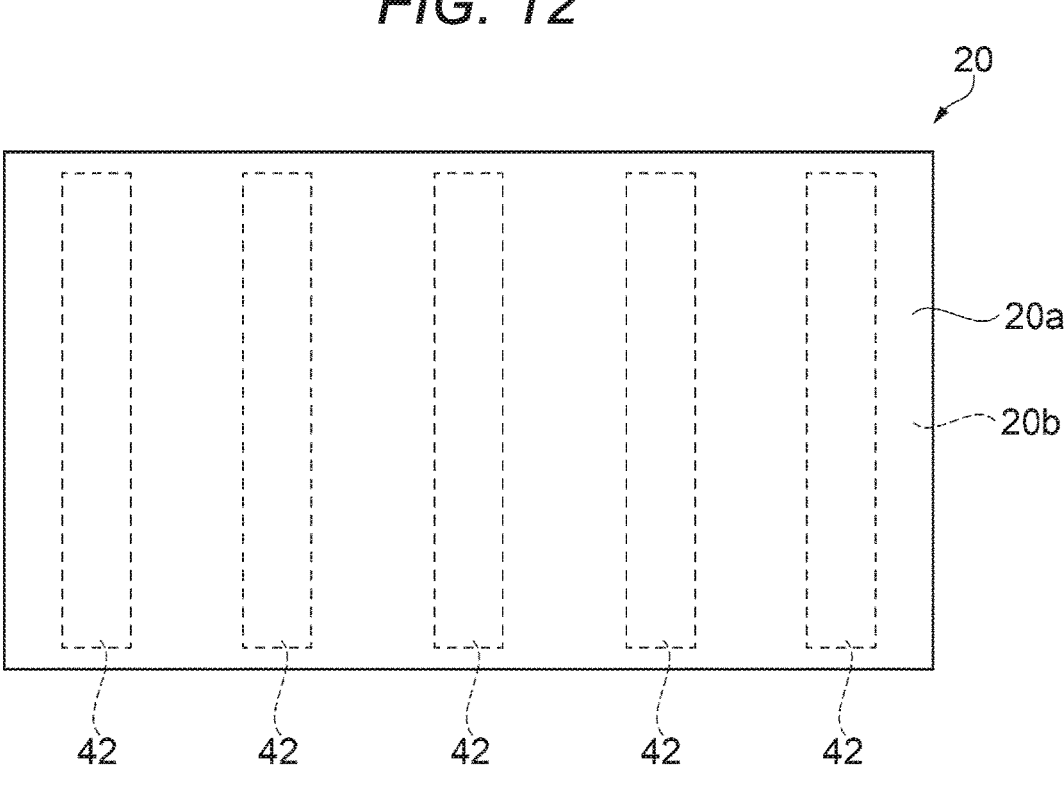
FIG. 12 is a plan view of a stage according to Embodiment 2.
Figure 12:
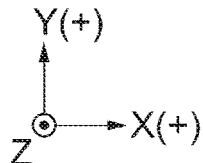

FIG. 12 is a plan view of a stage according to Embodiment 2 and corresponds to FIG. 5.

In the above embodiment, the heating unit 50 includes the first heaters 41, and the present disclosure is not limited to the configuration. Any heater capable of heating a shaped object may be used. For example, the stage 20 may include a heater. Hereinafter, the same reference signs are assigned to the same portions as those in the above-described embodiment, and a redundant description thereof will be omitted.

As shown in FIG. 12, the stage 20 according to the embodiment is provided with a plurality of second heaters 42. In the example of FIG. 12, five strip-shaped second heaters 42 extending in the Y plus direction are provided in a stripe shape on the stage 20. The second heater 42 is a heater the same as the first heater 41 in Embodiment 1, and is formed on the lower surface 20b of the stage 20. Heating of the second heaters 42 is controlled by the second heater drive unit 74 (FIG. 2). An arrangement mode of the second heater 42 is not limited thereto, and may be any arrangement mode capable of efficiently heating the shaped object on the stage 20. For example, when the stage 20 is divided into a first region including a center and a second region closer to peripheral edges of the stage 20 than the first region when viewed from the Z plus direction, the plurality of second heaters 42 may be disposed more densely in the second region than in the first region. Accordingly, it is possible to prevent a temperature decrease at the peripheral edges of the stage 20 and to make the temperature of the stage 20 uniform.

Heat generated by the second heaters 42 is radiated to the shaped object on the stage 20 via the stage 20, and the shaped object is heated. In other words, the stage 20 includes the second heaters 42, and at least one of the first heater 41 and the second heater 42 is formed of a glass heater made of a transparent conductive material provided on a glass substrate.

As described above, according to the three-dimensional shaping system 100 according to the embodiment, the following effects can be obtained in addition to the effects of the above-described embodiment.

The stage 20 includes the second heaters 42, and at least one of the first heater 41 and the second heater 42 is formed of a glass substrate and a glass heater provided with a transparent conductive material provided on the glass substrate.

Accordingly, since the shaped object on the stage 20 is heated by the first heater 41 from above and the second heater 42 from below, the shaped object can be efficiently heated. In other words, the shaped object can be efficiently heated from both front and back surfaces.

Therefore, it is possible to provide the three-dimensional shaping system 100 that is easy to control and capable of monitoring the shaped object.

Embodiment 3

Different Arrangement Mode of Heating Unit

Figure 13:
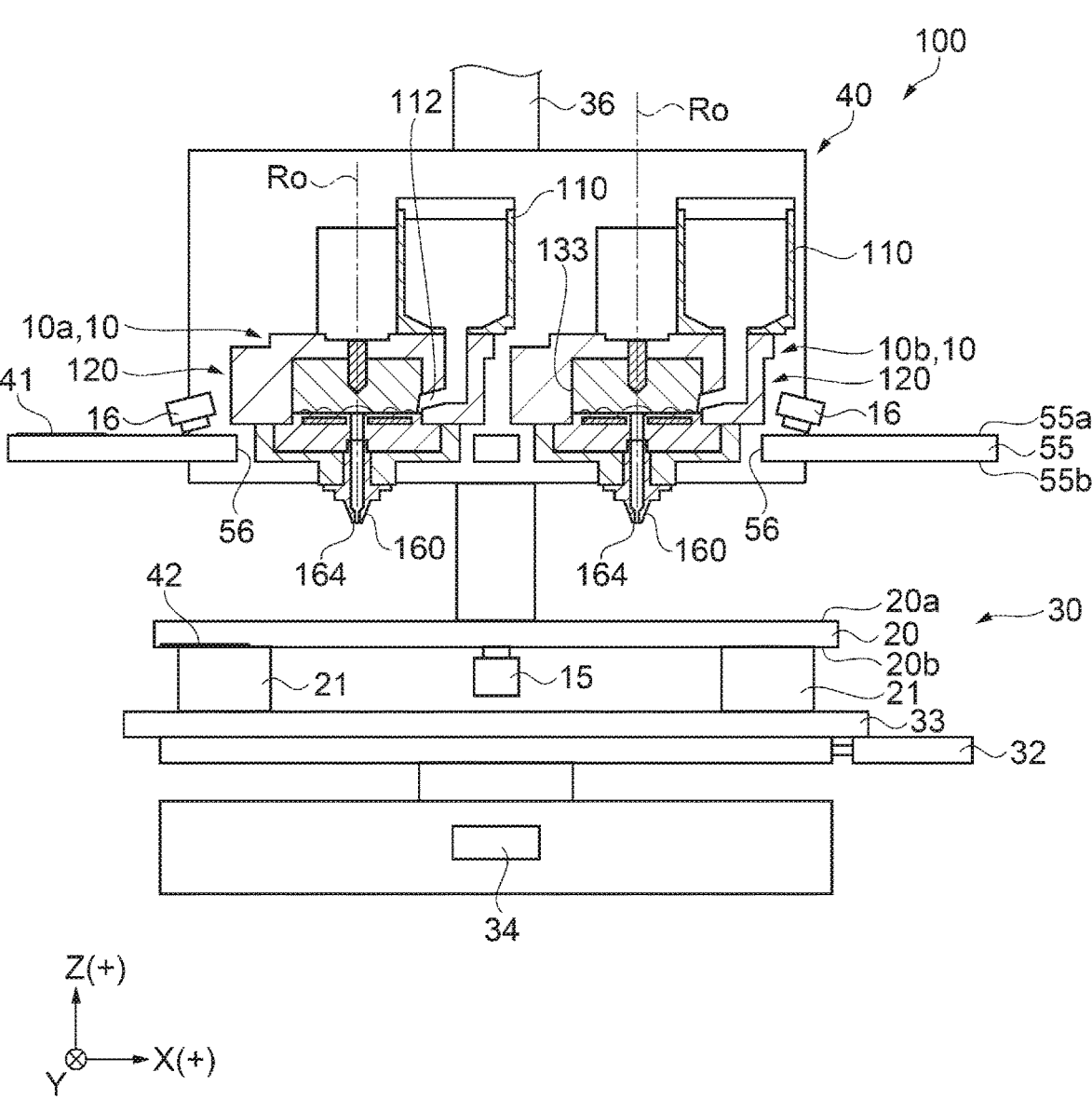
FIG. 13 is a cross-sectional view of a peripheral portion of a dispensing device according to Embodiment 3.

FIG. 13 is a cross-sectional view of a peripheral portion of a dispensing device according to Embodiment 3, and corresponds to FIG. 2.

In the above-described embodiments, the heating unit 50 is installed at a position substantially equal to the height of the nozzle 160, and the configuration is not limited thereto. The heating unit 50 may be installed at a higher position. Hereinafter, the same reference signs are assigned to the same portions as those in the above-described embodiment, and a redundant description thereof will be omitted.

As shown in FIG. 13, a heating unit 55 according to the embodiment is installed immediately below the plasticizing unit 120. That is, the heating unit 55 is disposed at a position (a Z plus side) higher than the heating unit 50 in Embodiment 1. Therefore, a diameter of a through hole 56 is larger than that of the through hole 51 in Embodiment 1, a lower portion of the dispensing device 10 is located in the through hole 56, and the distance between the heating unit 55 and the stage 20 is larger than the distance between the heating unit 50 and the stage 20 in FIG. 2. With the configuration, since the heating unit 55 is excellent in the infrared emissivity as described above, the shaped object on the stage can be heated.

In other words, during shaping of the shaped object, at least a part of the dispensing device 10 serving as the dispensing unit is located in the through hole 56.

As described above, according to the three-dimensional shaping system 100 in the embodiment, the following effects can be obtained in addition to the effects of the above-described embodiments.

During shaping of the shaped object, at least a part of the dispensing device 10 serving as the dispensing unit is located in the through hole 56.

With the configuration, as described above, since the heating unit 55 is excellent in the infrared emissivity, the shaped object on the stage can be heated. Accordingly, since the distance from the stage 20 can be set larger than that between the heating unit in the related art and the stage 20, the position control of the heating unit 55 is facilitated.

Therefore, it is possible to provide the three-dimensional shaping system 100 that is easy to control and capable of monitoring the shaped object.

Embodiment 4

Different Configuration of Heating Unit

Figure 14:
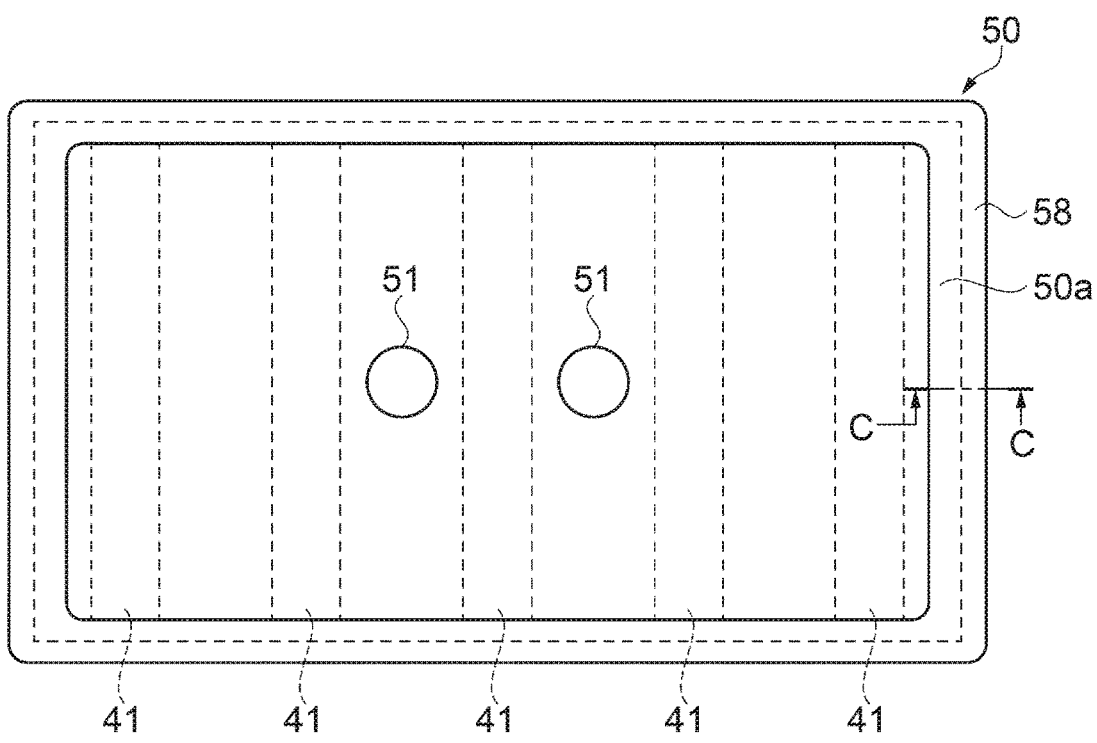
FIG. 14 is a plan view of a heating unit according to Embodiment 4.
Figure 14:
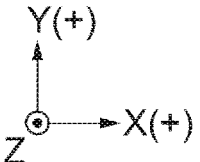
Figure 15:
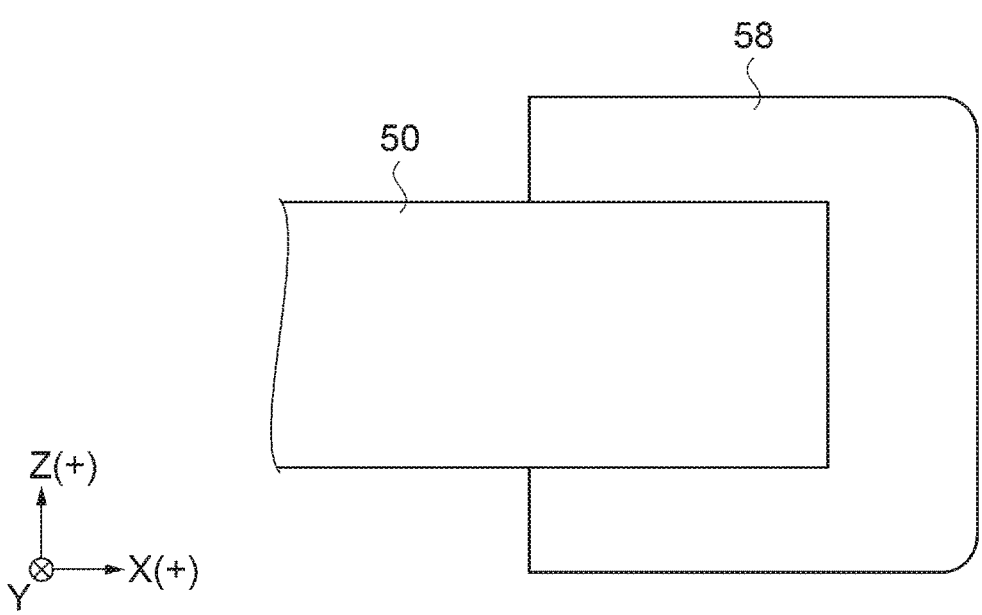
FIG. 15 is a cross-sectional view taken along a line c-c in FIG. 14.

FIG. 14 is a plan view of a heating unit according to Embodiment 4, and corresponds to FIG. 5. FIG. 15 is a cross-sectional view taken along a line c-c in FIG. 14.

A heat insulating member 58 may be provided at a peripheral edge portion of the heating unit 50 in the above embodiments. Hereinafter, the same reference signs are assigned to the same portions as those in the above-described embodiments, and a redundant description thereof will be omitted.

As described above, a glass substrate is adopted for the heating unit 50. Since glass has lower thermal conductivity than metal used in a heating unit in the related art, uniformity in temperature over an entire surface of the plate-shaped heating unit 50 becomes a problem. In particular, the temperature tends to decrease at the peripheral edge portion (an end portion) of the heating unit 50.

In view of this point, as shown in FIG. 14, the heating unit 50 according to the embodiment includes the heat insulating member 58 at the peripheral edge portion thereof. The heat insulating member 58 is made of resin, for example, polyurethane resin. Any resin having low thermal conductivity and flexibility may be used. For example, vinyl chloride resin or polypropylene may be used.

As shown in FIG. 15, the heat insulating member 58 is mounted to cover the end portion of the heating unit 50 from three directions in a cross section thereof. The heat insulating member 58 is not limited to being provided on an entire periphery of the peripheral edge portion of the heating unit 50, and may be selectively provided at an end portion where the temperature significantly drops. In other words, at least a part of the peripheral edge of the heating unit 50 is covered with the heat insulating member 58. Similarly, a heat insulating member may be provided at a peripheral edge portion of the stage 20. In this case, a temperature drop in the peripheral edge portion of the stage 20 can also be prevented, and uniformity in temperature over the entire surface of the stage 20 can be enhanced.

As described above, according to the three-dimensional shaping system 100 in the embodiment, the following effects can be obtained in addition to the effects of the above-described embodiments.

At least a part of the peripheral edge of the heating unit 50 is covered with the heat insulating member 58.

Accordingly, by providing the heat insulating member 58, it is possible to prevent the temperature drop in the peripheral edge portion of the heating unit 50 and to improve the uniformity in temperature over the entire surface of the heating unit 50. Therefore, temperature control of the heating unit 50 is facilitated.

Therefore, it is possible to provide the three-dimensional shaping system 100 that is easy to control and capable of monitoring the shaped object.

What is claimed is:

1. A three-dimensional shaping system comprising:
a dispensing unit including a plasticizing unit configured to plasticize a material to generate a plasticizing material and a nozzle configured to dispense the plasticizing material;
a stage allowing the plasticizing material to be laminated;
a moving unit configured to change a relative position between the nozzle and the stage; and a plate-shaped heating unit including a first heater configured to heat the plasticizing material laminated on the stage, the plate-shaped heating unit having a through hole formed therein, wherein
at least a part of the nozzle is located in the through hole during shaping of a shaped object,
the moving unit changes a position of the heating unit with respect to the stage in conjunction with a change in a position of the nozzle with respect to the stage,
a part of at least one of the stage and the heating unit is made of a transparent material, and
a detection unit configured to detect the shaped object on the stage via the transparent material, wherein the detection unit is disposed at least one of below the stage and above the heating unit.

2. The three-dimensional shaping system according to claim 1, further comprising:
a control unit configured to control at least the detection unit, wherein
the detection unit is disposed below the stage and above the heating unit, and
the control unit acquires a detection value of the detection unit below the stage while a first layer in contact with the stage is being shaped, and acquires a detection value of the detection unit above the heating unit while a second layer above the first layer is being shaped.

3. The three-dimensional shaping system according to claim 1, wherein the detection unit disposed below the stage measures a distance between a first layer in contact with the stage and the stage.

4. The three-dimensional shaping system according to claim 1, wherein the moving unit relatively moves the stage and the detection unit in a direction perpendicular to a lamination direction of the shaped object.

5. The three-dimensional shaping system according to claim 1, further comprising: a position adjustment unit configured to adjust a position of the detection unit.

6. The three-dimensional shaping system according to claim 1, wherein
the stage includes a second heater, and
at least one of the first heater and the second heater is formed of a glass substrate and a glass heater provided with a transparent conductive material provided on the glass substrate.

7. The three-dimensional shaping system according to claim 1, wherein
at least a part of the dispensing unit is located in the through hole during the shaping of the shaped object.

8. The three-dimensional shaping system according to claim 1, wherein
at least a part of a peripheral edge of the heating unit is covered with a heat insulating member.

* * * * *